United States Patent
Takei

(10) Patent No.: US 9,609,455 B2
(45) Date of Patent: Mar. 28, 2017

(54) CONNECTIVE DEVICE, APPLICATION PROGRAM AND CONTENT RETRIEVAL SYSTEM

(71) Applicant: Hideyuki Takei, Shinjuku-ku (JP)

(72) Inventor: Hideyuki Takei, Shinjuku-ku (JP)

(73) Assignee: BEATROBO, INC., San Francisco, CA (US)

( * ) Notice: Subject to any disclaimer, the term of this patent is extended or adjusted under 35 U.S.C. 154(b) by 67 days.

(21) Appl. No.: 13/934,297

(22) Filed: Jul. 3, 2013

(65) Prior Publication Data

US 2014/0045548 A1 Feb. 13, 2014

(30) Foreign Application Priority Data

Aug. 8, 2012 (JP) .................................. 2012-176354

(51) Int. Cl.
*H04M 1/00* (2006.01)
*H04W 4/00* (2009.01)
(Continued)

(52) U.S. Cl.
CPC .............. *H04W 4/00* (2013.01); *G06F 21/10* (2013.01); *G06F 21/44* (2013.01); *G06F 21/84* (2013.01)

(58) Field of Classification Search
CPC ....... H01L 2924/00014; H01L 2224/48; H01L 2224/78301; H01L 2224/85148;
(Continued)

(56) References Cited

U.S. PATENT DOCUMENTS 6,397,087 B1 * 5/2002 Kim ..................... H04B 1/3877
381/110
6,552,512 B1 * 4/2003 Harris ........................... 320/107
(Continued)

FOREIGN PATENT DOCUMENTS

JP H06-23338 U 3/1994
JP 2002-050978 A 2/2002
(Continued)

OTHER PUBLICATIONS

Office Action (Notice of Reasons of Rejection) issued on Sep. 8, 2014, by the Japanese Patent Office in corresponding Japanese Patent Application No. 2012-176354 and an English translation of the Office Action. (11 pages).

*Primary Examiner* — Timothy Pham
(74) *Attorney, Agent, or Firm* — Buchanan Ingersoll & Rooney PC

(57) ABSTRACT

The invention provides a new method to supply a power to a device which is used by connecting to a mobile terminal. The invention also provides a connective device which is connected and enables the mobile terminal to reproduce contents such as music on the mobile terminal. The connective device stores unique identifying information and is detachably connected to the mobile terminal provided with a communication function. The connective device is having a plug terminal connected to an earphone socket of the mobile terminal, and the plug terminal acquires a power from an audio output channel of the earphone socket and output the identifying information via a microphone channel of the earphone socket.

11 Claims, 5 Drawing Sheets

(51) Int. Cl.
*G06F 21/10* (2013.01)
*G06F 21/44* (2013.01)
*G06F 21/84* (2013.01)

(58) Field of Classification Search
CPC .............. H01L 24/78; H01L 24/85; H01L 2924/01004; H01L 2924/01005; H01L 2924/01006; H01L 2924/01015; H01L 2924/01023; H01L 2924/01033
USPC .............................................. 455/556.1, 557
See application file for complete search history.

(56) References Cited

U.S. PATENT DOCUMENTS

| | | | |
|---|---|---|---|
| 7,062,260 B2 | 6/2006 | Vuori | |
| 7,899,494 B2* | 3/2011 | Lee | H01M 10/48 455/418 |
| 8,208,853 B2* | 6/2012 | Lydon | G06F 21/31 455/41.2 |
| 2003/0211869 A1* | 11/2003 | Lee | 455/572 |
| 2004/0041911 A1 | 3/2004 | Odagiri et al. | |
| 2008/0004894 A1* | 1/2008 | Son et al. | 705/1 |
| 2010/0222000 A1* | 9/2010 | Sauer et al. | 455/41.2 |
| 2010/0251333 A1 | 9/2010 | Miura et al. | |
| 2011/0031808 A1* | 2/2011 | Hwang | 307/39 |
| 2012/0207318 A1* | 8/2012 | Tsuchiya | H04R 3/00 381/71.6 |
| 2012/0208461 A1* | 8/2012 | Choi | H04W 4/008 455/41.2 |
| 2012/0293001 A1* | 11/2012 | Chan et al. | 307/66 |
| 2013/0083927 A1* | 4/2013 | Savant | 381/2 |
| 2013/0092843 A1* | 4/2013 | Turqueti | G01T 7/00 250/369 |

FOREIGN PATENT DOCUMENTS

| | | |
|---|---|---|
| JP | 2004-297813 A | 10/2004 |
| JP | 2005-295031 A | 10/2005 |
| JP | 2006-243961 A | 9/2006 |
| JP | 2014-500537 A | 1/2014 |
| WO | WO 2009/057485 A1 | 5/2009 |
| WO | 2012/051071 A1 | 4/2012 |

\* cited by examiner (a)

(b)

(c)

CONNECTIVE DEVICE, APPLICATION PROGRAM AND CONTENT RETRIEVAL SYSTEM

FIELD OF THE INVENTION

The present invention relates to a connective device, application program and content retrieval system which is used to retrieve content such as music and user information using a mobile terminal such as smart phone, which uses a new method to obtain power.

TECHNICAL BACKGROUND

Currently, distribution service such as music distribution to mobile terminal such as smart phone is provided. For example, patent document 1 discloses content delivery system. The content delivery system utilizes IDs (device ID, device authentication ID) including master ID information (unique user ID to identify user, authentication ID for user) and slave ID information (unique information to identify information processing terminals used by an end user of the service; i.e. IP address, domain name, URI (Uniform Resource Identifier), a MAC address, or a serial number) to obtain authentication for the content distribution service. Since the above mentioned content delivery system uses information for identifying user or information processing terminal as the information for authentication, the authentication must be performed on different ID when the user is changed or different information processing terminal is used.

RELATED ART

Patent Document

[Patent Document 1] WO2009/057485

SUMMARY OF THE INVENTION

Problems to be Solved

Standard multi-function mobile terminal such as smart phone has a socket for mini-plug to input/output voice signal in addition to connector for sending/receiving data. The voice input/output socket is usually used to connect earphone or microphone, and it is not thought to be used to connect devices other than these devices. There was no such device existed which utilizes an audio signal which is output from the socket for the audio signal as the power for driving.

Furthermore, the aforementioned conventional content delivery system is the service available only to contracted mobile terminals or users, and it is not possible for a plurality of person to share or exchange content such as music.

The present invention was made in consideration of the above mentioned problems. It is an object of the invention to provide a connective device, application program and content retrieval system which is constructed to be attached to a mobile terminal for streaming or downloading pictures, images, text or music, and can be reproduced with the mobile terminal without authentication depending on a specific mobile terminal or users. The invention also provides a new method for supplying power to a device connected to the mobile terminal, including the connective device which can be used for the above mentioned purpose.

Means to Solve the Problems

In order to solve the above mentioned problem, the invention has the following construction: a connective device incorporating an IC, which is detachably connected to a mobile terminal with communication function. The device is equipped with a plug terminal connected to an earphone socket of the mobile terminal. The plug terminal utilizes audio signal output from the earphone socket as the power for driving the IC.

The invention also has the following construction: a connective device which stores unique identification information and detachably connected to a mobile terminal with communication function. The device is equipped with a plug terminal connected to an earphone socket of the mobile terminal. The plug terminal obtains power from an audio output channel of the earphone socket and output the identification information via a microphone channel of the earphone socket.

The invention also has the following construction: an application program which runs on the mobile terminal with an earphone socket. The application program receives from a connective device unique identifying information stored in the connective device connected to the earphone socket. The application program receives information concerning a content retrieval destination from an administrative server linked to the Internet. The content can be output via display means, audio output means, or both of the display and audio output means. The content is obtained based on the received information and output via display means, audio output means, or both of the display and audio output means.

The invention also has the following construction: an administrative server which provides information to a mobile terminal for connection to a content server which distributes content to be able to output via display means, audio output means, or both of the display and audio output means. A connective device detachably connected to the mobile terminal and storing unique identification information. An application program which runs on the mobile terminal. The application program receives information concerning a content retrieval destination from the administrative server based on the unique identification information received from the connective device, and receives content from the content server based on the received information, which can be reproduced by the mobile terminal.

Effects of the Invention

The connective device of the present invention acquires power via an earphone socket of the mobile terminal, and provides unique identification information to the mobile terminal via the earphone socket. The present invention has an effect which enables to receive various services and contents via the Internet by way of providing unique identification information.

The application program of the present invention has an effect which enables to receive unique identification information stored in a connective device via an earphone socket of a mobile terminal, and receives information concerning retrieval of content based on the received identification information, and reproduce the content such as music and video. Furthermore, the present invention has an effect which enables to utilize servers open to general users, and it is not necessary for administrative server itself to store contents.

The content retrieval system of the present invention enables to receive information concerning retrieval of content and retrieve content such as music and video and reproduce them. It is possible to utilize open server as the content server which is open to general user for free use, and it is not necessary for administrative server itself to store the contents.

DETAILED DESCRIPTION OF THE EMBODIMENTS

Figure 1:
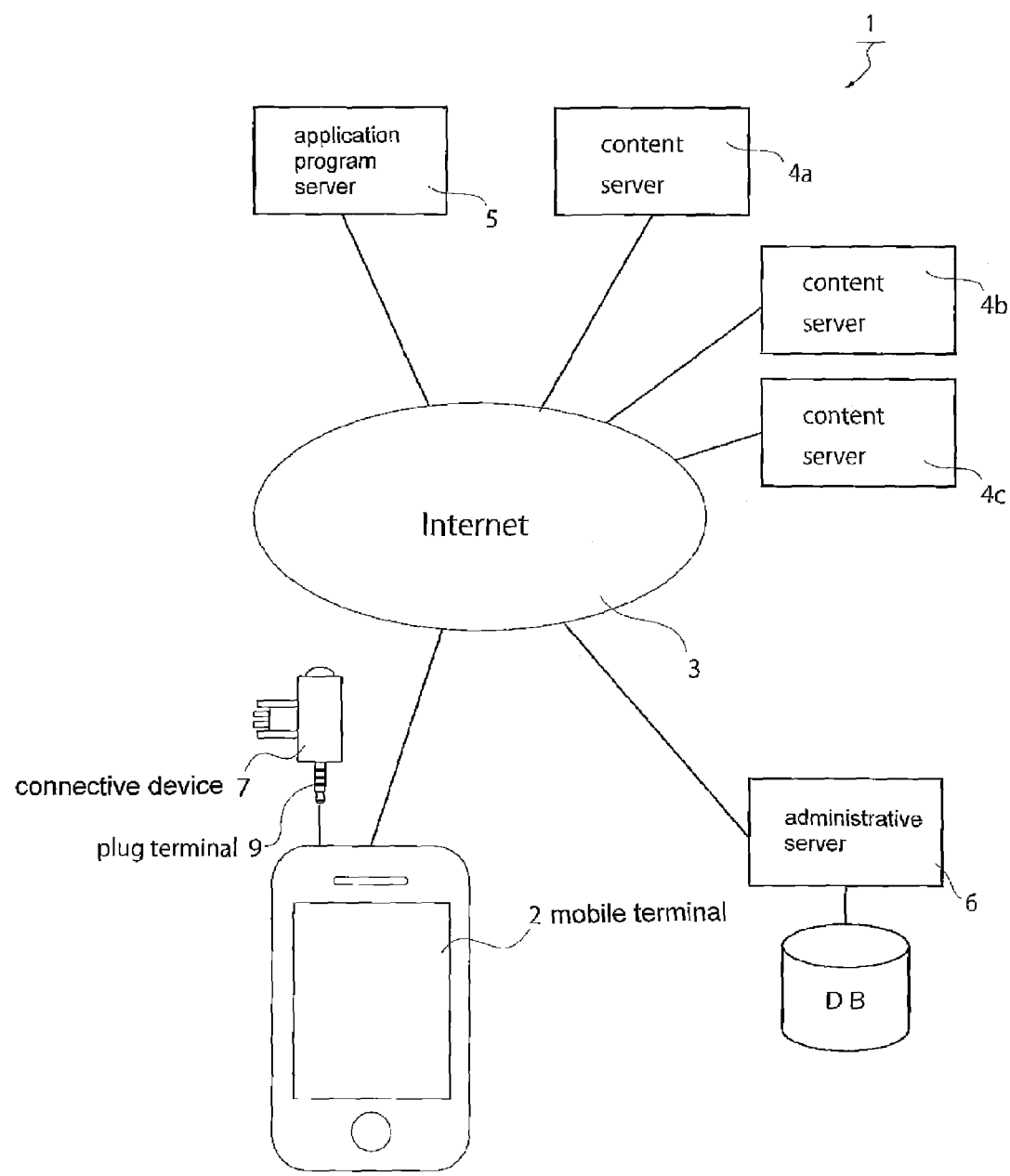
FIG. 1 An explanatory figure illustrating outline of the content retrieval system of the present invention.

Embodiments of the invention will be explained with reference to the drawing. FIG. 1 is an explanatory figure illustrating the outline of the content retrieval system (hereafter referred to as "the system") 1 of the present invention. The system 1 uses smart phone, which is one of the examples of mobile terminal 2, to stream or download content including video and music data from content distribution server (hereafter referred to as "content server") 4 (4a, 4b, 4c . . . ) connected to the Internet to be played on the smart phone. The content received by the mobile terminal 2 includes not only video and music data, but also digital data including user ID, identification number, and personal information.

The system 1 has an application program server 5 which provides an application software (hereafter referred to as "application program") to mobile terminal 2, an administrative server 6 which administers access information to content server 4 and so on, and a connective device 7 connected to mobile terminal 2. The application program server 5 and content server 4 are both hardware means having components such as connection means to the Internet, CPU, memory, storage means, keyboard, display which should be equipped with computers.

Figure 2:
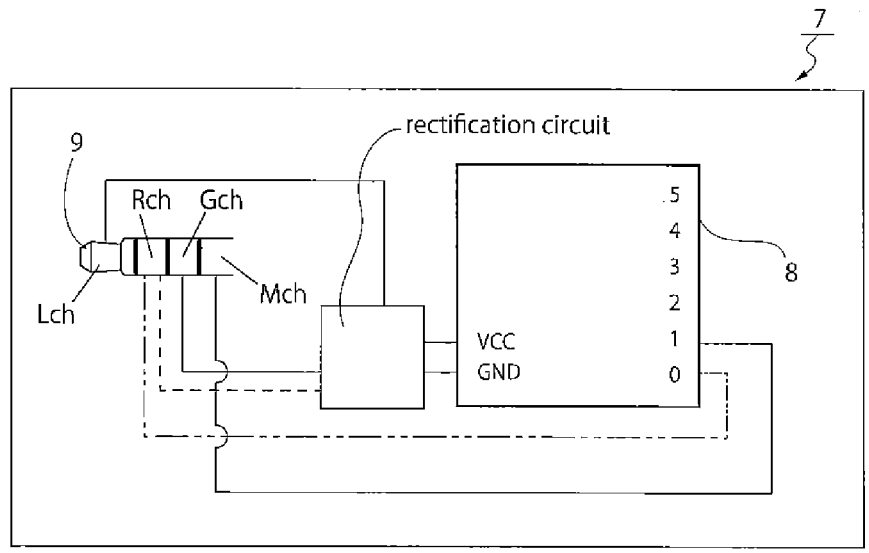
FIG. 2 A circuit block diagram of the connective device of the present invention.
Figure 2:
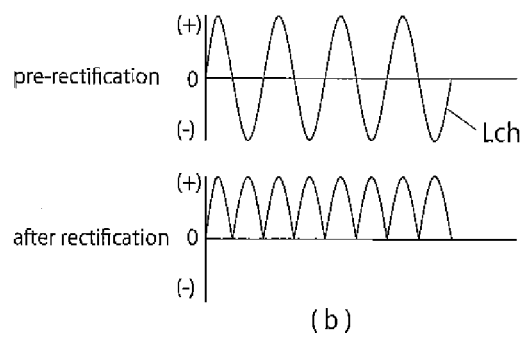
Figure 2:
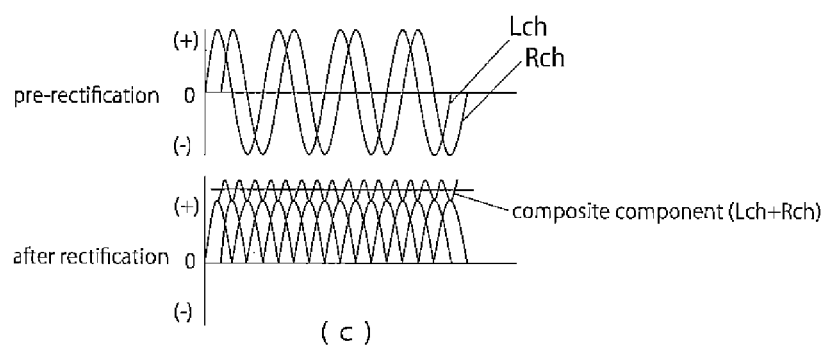

FIG. 2 is an explanatory figure of the circuit of the connective device 7, and FIG. 2(a) is the circuit block diagram in which detailed circuit configuration is omitted. The connective device 7 has a configuration like a small doll incorporating a IC 8 to be a microcomputer and a plug terminal 9 connected to the IC 8. The configuration of the connective device is not limited to this. It is possible to be other designs, materials and forms. The plug terminal 9 is formed in a specification to be able to connect detachably to an earphone socket of the mobile terminal having 4 poles consist of grounding, right and left sound track control terminal, and microphone, and electrically connected with 3 poles (grounding, left sound track control terminal and microphone) or all 4 poles. The IC 8 is driven by an electric current supplied from the left sound track control terminal and outputs unique identification information ID (Gadget ID) stored in the IC 8 through the microphone (MIC) terminal.

The plug terminal 9, as previously mentioned, is formed as a mini plug which has 4 poles i.e., left sound track control (Lch), right sound track control (Rch), grounding (Gch), and microphone (Mch) corresponding to the socket of the mobile terminal 2. Each electrode of the plug terminal 9 is connected to each terminal of the IC 8 through the previously mentioned circuit, the detail of which is omitted. In an embodiment of the present invention, a sine wave with an adjusted output level is output from the channel for the left sound track control when the application program starts or a prescribed mode of the application program is executed on the mobile terminal. The voltage waveform of the signal input to the left sound track control (Lch) is the waveform before rectification illustrated in the upper section of FIG. 2(b). The voltage waveform after rectification is illustrated in the lower section of FIG. 2(b), where a negative component of the signal is converted to a positive component and the positive component is taken out. Furthermore, the positive component can be obtained by removing the negative component from the pre-rectification waveform illustrated in the upper section of FIG. 2(b) (not shown).

The identification information ID stored in IC 8 is output to the mobile terminal 2 by using the signal rectified in the above way as the voltage for activating the IC 8.

The signal output by the application program is an audio signal having a frequency outside the audible range or the range not perceived as a noise (for example, 50 Hz or lower). If the output level (signal amplitude) is low, the signal cannot be used as the power source, since the voltage of the signal is insufficient. Therefore, the signal level output from the mobile terminal 2 by the application program is controlled to be maximum or above a certain level. Furthermore, under a circumstance where the signal level is weak, a capacitor can be set within a circuit to accumulate electricity or to mitigate voltage fluctuation in order to stabilize the electric power.

In the above mentioned example, electric power for activation is acquired from the left audio control (Lch) only. It is possible to use both right audio control (Rch) and left audio control (Lch) as the power source for activation as illustrated by the waveform in FIG. 2(a). In this case, the sine wave is output to both of the right and left sound control channels by the above mentioned application program.

In this case, as illustrated in FIG. 2(c), it is possible to arrange to keep the direct current component after the rectification to 0 volt or over and minimize the fluctuation of voltage by shifting the phase of the sign wave by 90 degrees and converting the negative components of each sine wave to positive components and composing the components (Lch+Rch).

Furthermore, the right sound control (Rch) can be connected to a signal channel of IC 8 as illustrated in FIG. 2(a) by the dashed-dotted line, instead of using it as the power source. In this case, the right sound control (Rch) channel can output a signal, such as, for authentication by the application program.

In the above embodiment, output of identification information ID of IC 8 and access by the application program is available only when a specific signal is received from the right sound control (Rch) channel, which can be used as a means to prevent unauthorized usage of application programs and connective devices.

Figure 3:
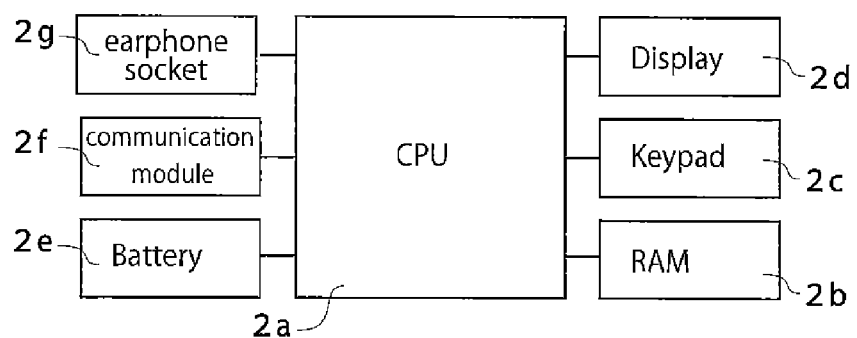
FIG. 3 A block diagram illustrating the configuration of the mobile terminal of the present invention.

FIG. 3 is a block diagram showing the main hardware configuration of the mobile terminal 2. The mobile terminal 2 is a telecommunication device such as smart phone having hardware means including CPU 2a, RAM 2b, keypad 2c, display 2d, battery 2e, communication module 2f, earphone socket 2g. The communication module 2f has a wireless communication function to connect to a public line, and a wireless connection function to connect to LAN equipment such as WiFi. The mobile terminal 2 is designed to be able to connect to the Internet, other than the function as a telephone for verbal communication.

The identification information ID stored in the IC 8 of the connective device 7 is data having start bit 5 bits, stop bit 5 bits and 40 bits of information different in each of the connective device 7. The identification information ID is serially transmitted via the microphone (MIC) terminal after the power is supplied by the above mentioned means. It is possible to attach error detection coding for data correction. The identification information ID transmitted from the connective device 7 is used by an application program separately downloaded to the mobile terminal 2 from an application program server 5. The application program communicates with the administrative server 6 via the Internet, and receives information from various database provided in the administrative server 6 using the identification information ID. The screen display on the mobile terminal 2 and access to the content server 4 is conducted based on the received information.

The administrative server 6 is also accessible by a general personal computer. It is possible to add a content which can be viewed on the mobile terminal 2 to which the connective device is attached and edit after authentication of the previously registered user ID and pass word.

The administrative server 6, as a database, has an administrative table (1), an avatar table (2), a user table (3), a content table (4), and a content retrieval destination table (5) other than the program for communicating and controlling the application program. The administrative table (1) is a data table to associate the identification information ID of the connective device 7 with an avatar ID for identifying an avatar which is displayed on the mobile terminal 2 by the application program. The avatar ID may be set to correspond to one identification information ID on a one-to-one basis, or one avatar ID may be set to correspond to a plurality of identification information ID.

The avatar table (2) is a table which associates avatar ID with user ID and other information associated with these IDs. As the result, a particular avatar is displayed on the mobile terminal 2, and a content associated with the avatar is displayed and streamed (reproduced).

User table (3) is a data table which stores unique user ID, user's full name and usage condition, and so on. Content table (4) is a data table which associates user ID, avatar ID and content retrieval destination ID allocated to each content retrieval destination (Same content can be retrieved from different destination.). Content retrieval destination table is a table which associates the data including an information designating content retrieval destination and content retrieval destination ID described in URL and so on.

Figure 4:
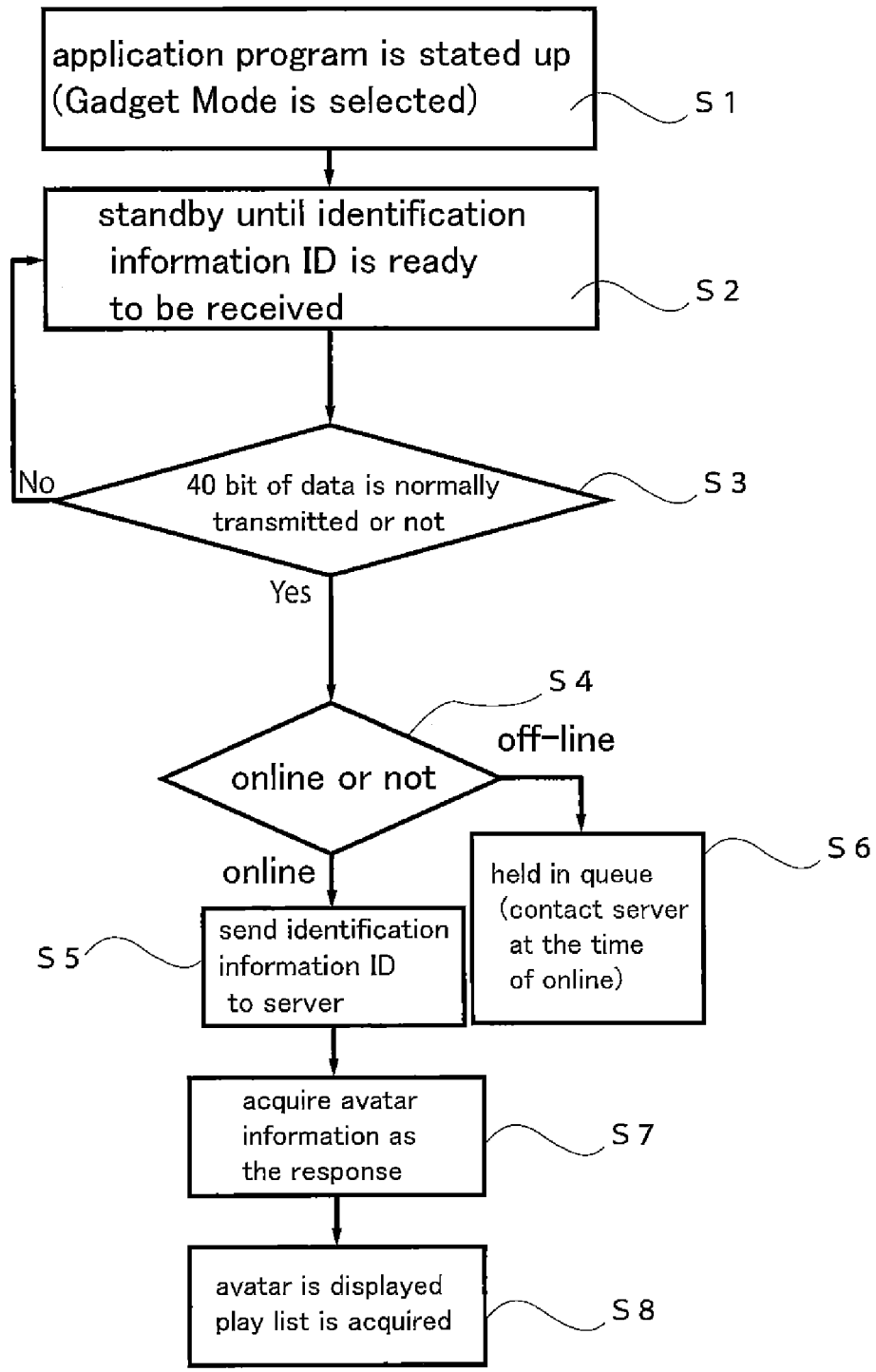
FIG. 4 A flowchart of the application program of the present invention.

The connective device and the operation of the content retrieval system of the present invention will be explained with reference to FIG. 4. The mobile terminal 2 accesses an application program server 5 and download an application program in advance. The application program is activated and Gadget Mode is selected (S1) to use the connective device 7. The Gadget Mode is one of the functions of the application program to utilize the identification information ID of the connective device 7. After the Gedget Mode is executed, there is a standby period until receipt of the identification information ID (S2). That is to say, there is a standby period until the connective device 7 is connected to the mobile terminal 2. At this time, the application program outputs a suitable volume of audio signal to be used as power to earphone socket and the power is supplied to the connective device 7 connected to the earphone socket. When a plug 9 of the connective device 7 is fit in the earphone socket of mobile terminal 2 during the standby period, the mobile terminal 2 receives the identification information ID of the connective device 7. The application program monitors a microphone terminal of the earphone socket and waits the identification information ID of the connective device 7 is transmitted from the microphone terminal. If the identification information ID is not received, the process repeats and the program waits for the identification information ID to be transmitted (S3).

Once the mobile terminal 2 receives the identification information ID via the microphone terminal, it is determined whether the mobile terminal 2 is connected to the Internet (whether the mobile terminal 2 is online or not) (S4). The identification information ID is sent to an administrative server 6, if it is online (S5). If it is not online, the mobile terminal 2 keeps and waits to transmit the identification information ID until it becomes online to be able to transmit the identification information ID (S6). The administrative server 6 which received the identification information ID receives information corresponding to the identification information ID from the data table as the avatar information (S7). The avatar information includes information related to the avatar ID and so on. A content is displayed on the screen of mobile terminal 2 based on the avatar information (S8).

The avatar information corresponding to the specific identification information ID is stored by the application program even after the connective device 7 is unplugged. If a connective device with different identification information is used, new avatar information is added to the already acquired avatar information.

As mentioned above, when the connective device 7 is plugged into the earphone socket of the mobile terminal in which an application program has been activated in advance, a content is displayed or reproduced as if the connective device 7 stores the content. Accordingly, it is possible to provide music to others as if lending or borrowing CD by lending or borrowing the connective device 7 despite the connective device 7 itself does not store a content.

Although, the above embodiment was explained with reference to music as an example, it is possible to display content like video such as movie and promotion video, or other content accompanying exchange of contact address or personal information.

Figure 5:
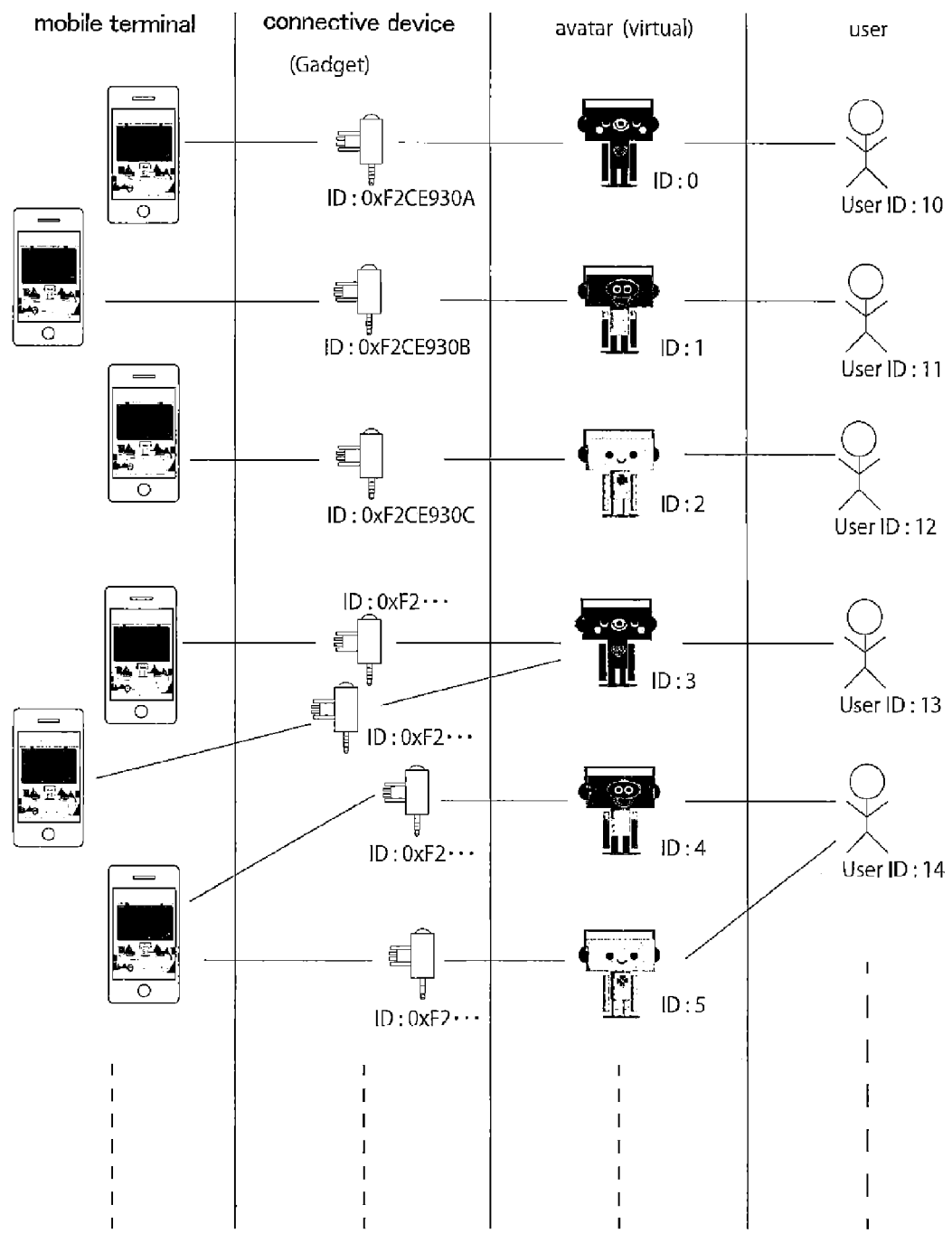
FIG. 5 An explanatory figure illustrating embodiments of the present invention.

The relation between user (user ID), avatar (avatar ID), connective device 7 (identifying information ID) and mobile terminal will be explained with reference to FIG. 5. In FIG. 5, the user is a plurality of person registered in administrative server using a user ID. An avatar is a non-existent administrative concept identified by an avatar ID and associated with existing connective device 7 identified by the identifying information ID. The mobile terminal activates the application program and acquire, display and reproduce a content by utilizing the connective device 7.

The users identified by user ID: 10, 11, 12 shown in FIG. 5 are associated with each avatar ID: 0, 1, 2 respectively on the administrative server 6. Each of the avatar ID is associated with any one of connective device 7. This is the most common example where one user owns one connective device 7 and display or reproduce the retrieved content on the mobile terminal owned by him/her.

In the case of the user who is identified by the user ID: 13, a single avatar (ID: 3) is associated on the administrative server 6. However, the avatar ID: 3 is associated with two or more connective devices 7. That is to say, a plurality of connective device 7 are provided so that they are used with one or more mobile terminal regardless he or she is a registered user or not, and the same content is provided utilizing this plurality of connective device 7. This makes it possible for artists and record companies to use this system to promote new songs by distributing the connective devices 7 to a large indefinite number of users to promote their songs multiple undefined users and displaying content for advertising, or enabling users to listen to a song on a trial basis.

Furthermore, in the case of the user identified by user ID 14, the user has two connective devices 7, and avatars (ID: 4 and ID: 5) corresponding to each of the connective device 7 are stored on the administrative server 6. When one the connective device 7 is connected to the mobile terminal, it is possible to acquire the avatar information corresponding to the avatar ID: 4 and the content associated with it. When another connective device 7 is connected to the same mobile terminal, it is possible to acquire the avatar information corresponding to the avatar ID 5 and the content associated with it.

INDUSTRIAL APPLICATION

The present invention is available to a connective device, application program and content distribution system, which can display and reproduce content such as music, video and user information by connecting mobile terminal.

EXPLANATION OF REFERENCE NUMBER

1 Content retrieval system
2 Mobile terminal
3 Internet
4 Content server
5 Application program server
6 Administrative server
7 Connective device
8 IC
9 plug terminal

What is claimed is:

1. A connective device incorporating an Integrated Circuit and the connective device is detachably connectable to a mobile terminal having a communication function; the connective device comprising:
   a storage storing identification information unique to the connective device so that the connective device can be distinguished from all other connective devices;
   a plug terminal connectable to an earphone socket of the mobile terminal, the plug terminal having a right audio control (Rch) and a left audio control (Lch) for receiving an audio signal;
   a rectification circuit configured to shift a phase of sign waves of respective audio signals received through the right audio control and/or the left audio control, and negative components included in the sign waves are rectified and converted to positive components, and to compose the signals so that a voltage after conversion is zero or over;
   wherein the composed signal is used as a power to drive the Integrated Circuit; and
   wherein the connective device is configured to output the identification information through a microphone channel of the plug terminal to the mobile terminal by driving the Integrated Circuit with the power; and
   wherein the output identification information is configured to enable the mobile terminal to download content from the internet.

2. The connective device of claim 1, wherein the connective device is detachably connected to the mobile terminal and the plug terminal is connected to the earphone socket of the mobile terminal.

3. The connective device of claim 1, wherein the rectification circuit is configured to shift a phase of sign waves of respective audio signals received through the right audio control and the left audio control.

4. A connective device, wherein the connective device is detachably connectable to a mobile terminal having a communication function; the connective device comprising:
   a storage storing identification information unique to the connective device so that the connective device can be distinguished from all other connective devices;
   a plug terminal connectable to an earphone socket of the mobile terminal, the plug terminal having a right audio control (Rch) and a left audio control (Lch) for receiving an audio signal;
   a rectification circuit configured to shift a phase of sign waves of respective audio signals received through the right and/or left audio controls, and negative components included in the sign waves are rectified and converted to positive components, and to compose the signals so that a voltage after the composition is zero or over, and power is obtained from the composed signal;
   wherein the identification information is output via a microphone channel to the earphone socket of the mobile terminal; and
   wherein the output identification information is configured to enable the mobile terminal to download content from the internet.

5. The connective device of claim 4, wherein the connective device is detachably connected to the mobile terminal and the plug terminal is connected to the earphone socket of the mobile terminal.

6. A content retrieval system utilizing a mobile terminal having an earphone socket and connectable to the Internet, comprising:
   a connective device detachably connectable to the earphone socket of the mobile terminal and storing identification information unique to the connective device so that the connective device can be distinguished from all other connective devices;
   an application program executed on the mobile terminal;
   wherein the connective device is constructed so that a phase of sign waves of respective audio signals received through right and/or left controls is shifted, and negative components included in the sign waves are rectified and converted to positive component, and the audio signals are composed so that voltage after the composition is zero or over, and the rectified signal is used a power for driving the connective device to output the unique identification information;
   wherein the application program is configured to output a sign wave signal for generating power to a right sound output terminal and/or a left sound output terminal of the earphone socket and to receive the unique identification information of the connective device via a microphone terminal of the earphone socket;
   wherein the mobile terminal is constructed to receive information concerning a content retrieval destination from an administrative server based on the unique identification information received from the connective device, and a content which can be displayed or reproduced by the mobile terminal is received from a content server based on the received information; and wherein the administrative server provides information concerning connection to the content server to a mobile terminal, wherein the content server distributes a content which can be output via a display or audio output, or both of the display and the audio output.

7. The content retrieval system of claim 6, wherein the connective device is detachably connected to the earphone socket of the mobile terminal.

8. The content retrieval system of claim 6, wherein the connective device is constructed so that a phase of sign waves of respective audio signals received through right and left controls is shifted, and wherein the application program is configured to output a sign wave signal for generating power to a right sound output terminal and a left sound output terminal of the earphone socket.

9. The content retrieval system of claim 6, wherein the content retrieval system includes the administrative server.

10. A nontransitory computer readable medium encoded with an application program for executing on a mobile terminal having an earphone socket and connectable to the Internet; the application program causing the mobile terminal to:
output a sign wave audio signal for generating a power for driving a connective device connected to the earphone socket to both of a right sound output terminal and/or a left sound output terminal of the earphone socket;
obtain identification information unique to the connective device from the connective device, wherein the connective device is driven by the power generated by the audio signal via a microphone terminal connected to the earphone socket, wherein the identification information enables the connective device to be distinguished from all other connective devices;
receiving information concerning a content retrieval destination from an administrative server linked to the Internet based on the received identification information, wherein the content can be output via a display or an audio output, or both, of the display and the audio output of the mobile terminal, and
receiving the content based on the received identification information and output via the display or the audio output, or both, of the display and the audio output.

11. The nontransitory computer readable medium of claim 10, the application program causing the mobile terminal to output a sign wave audio signal for generating a power for driving a connective device connected to the earphone socket to both of a right sound output terminal and a left sound output terminal of the earphone socket.

* * * * *